US012606263B2

(12) United States Patent
Wetch et al.

(10) Patent No.: US 12,606,263 B2
(45) Date of Patent: Apr. 21, 2026

(54) MOTORCYCLE CHILD SAFETY SYSTEM

(71) Applicants: Raymond Wetch, Williston, ND (US);
Christopher Adams, Williston, ND
(US)

(72) Inventors: Raymond Wetch, Williston, ND (US);
Christopher Adams, Williston, ND
(US)

( * ) Notice: Subject to any disclaimer, the term of this
patent is extended or adjusted under 35
U.S.C. 154(b) by 389 days.

(21) Appl. No.: 18/206,807

(22) Filed: Jun. 7, 2023

(65) Prior Publication Data

US 2024/0409172 A1 Dec. 12, 2024

(51) Int. Cl.
*B62J 25/08* (2020.01)
*B62J 25/06* (2020.01)

(52) U.S. Cl.
CPC .............. *B62J 25/08* (2020.02); *B62J 25/06*
(2020.02)

(58) Field of Classification Search
CPC .................................. B62J 25/06; B62J 25/08
USPC ....................................................... 280/291
See application file for complete search history.

(56) References Cited

U.S. PATENT DOCUMENTS

| | | | | |
|---|---|---|---|---|
| 7,182,359 | B2 * | 2/2007 | Galvagno | ................ B62J 25/08 |
| | | | | 280/288.4 |
| 7,258,357 | B1 * | 8/2007 | Berezny | ..................... B62J 1/12 |
| | | | | 280/288.4 |
| 7,344,329 | B2 * | 3/2008 | Hutchinson | ............ B62K 21/22 |
| | | | | 403/109.1 |
| 7,685,904 | B2 * | 3/2010 | Cutsforth | ............... B62K 21/16 |
| | | | | 74/551.3 |
| 8,215,201 | B2 * | 7/2012 | Schindler | ............... B62K 21/16 |
| | | | | 403/109.5 |
| 9,610,995 | B2 * | 4/2017 | Hon | ......................... B62J 25/08 |
| 10,167,039 | B1 * | 1/2019 | Manuel | .................... B62J 25/06 |
| 2010/0269624 | A1 * | 10/2010 | Price | .................... B62K 21/125 |
| | | | | 74/551.8 |

* cited by examiner

*Primary Examiner* — Minnah L Seoh
*Assistant Examiner* — Hosam Shabara
(74) *Attorney, Agent, or Firm* — The Rapacke Law
Group, P.A.

(57) ABSTRACT

A motorcycle child safety system is disclosed, including a
handlebar including a handlebar mount to couple the handle-
bar to a gas tank of a motorcycle. A riser extends between
the handlebar mount and a left bar and a right bar, wherein
a child grasps the left bar and right bar. Two foot pegs are
provided, wherein a first foot peg is positioned on a left side
of the motorcycle and a second foot peg positioned on a right
side of the motorcycle to allow the child to rest their feet on
each foot peg. The handlebar and the two foot pegs comprise
the motorcycle safety system to permit the child to be seated
in front of an operator on the motorcycle, and wherein the
child grasps the handlebars while resting the child's feet on
the foot pegs during use of the motorcycle.

18 Claims, 3 Drawing Sheets

MOTORCYCLE CHILD SAFETY SYSTEM

TECHNICAL FIELD

Embodiments of the invention relate to motorcycle safety accessories and more particularly to motorcycle foot pegs and handlebars for a child.

BACKGROUND

Motorcycles are two or three-wheeled motorized vehicles steered by a handlebar from a saddle-style seat. Riders will often add accessories to the motorcycle to increase safety, performance, comfort and/or modify the aesthetics of the vehicle. In particular, handlebars are often modified to provide comfort to riders of various heights, as well as to modify the aesthetics. Further, foot pegs provide a rest for the foot, and may be modified to change the position of the pegs for the primary rider.

In some instances, passengers may also ride on the motorcycle and often ride on the back of the motorcycle behind the driver. Auxiliary pegs are provided for the passenger while they may choose to hold onto the driver for stability. While effective, this position may be dangerous for children who do not have the strength, or wherewithal to safely ride in this position.

SUMMARY OF THE INVENTION

This summary is provided to introduce a variety of concepts in a simplified form that is disclosed further in the detailed description of the embodiments. This summary is not intended for determining or limiting the scope of the claimed subject matter.

The embodiments provided herein relate to a motorcycle child safety system motorcycle child safety system is disclosed, including a handlebar including a handlebar mount to couple the handlebar to a gas tank of a motorcycle. A riser extends between the handlebar mount and a left bar and a right bar, wherein a child grasps the left bar and right bar. Two foot pegs are provided, wherein a first foot peg is positioned on a left side of the motorcycle and a second foot peg positioned on a right side of the motorcycle to allow the child to rest their feet on each foot peg. The handlebar and the two foot pegs comprise the motorcycle safety system to permit the child to be seated in front of an operator on the motorcycle, and wherein the child grasps the handlebars while resting the child's feet on the foot pegs during use of the motorcycle.

The components of the motorcycle safety system may be readily removed or engaged to the motorcycle by the operator when needed (i.e., when the child is riding on the motorcycle. This allows for efficient use of the motorcycle safety system to provide a comfortable and safe means of transporting the child on the motorcycle while the child rides in front of the operator.

In one aspect, a height of the handlebar is adjustable via an adjustable riser.

In one aspect, the handlebar mount is adjustable by moving the handlebar mount toward a front or a back of the gas tank.

In one aspect, the left bar includes a first grip, and the right bar includes a second grip.

In one aspect, each of the two foot pegs are mounted to a transmission case via a bracket.

In one aspect, each of the two foot pegs are mounted to the primary case via the bracket.

In one aspect, each of the two foot pegs extend laterally from the bracket.

In one aspect, each of the two foot pegs include a rubber pad.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
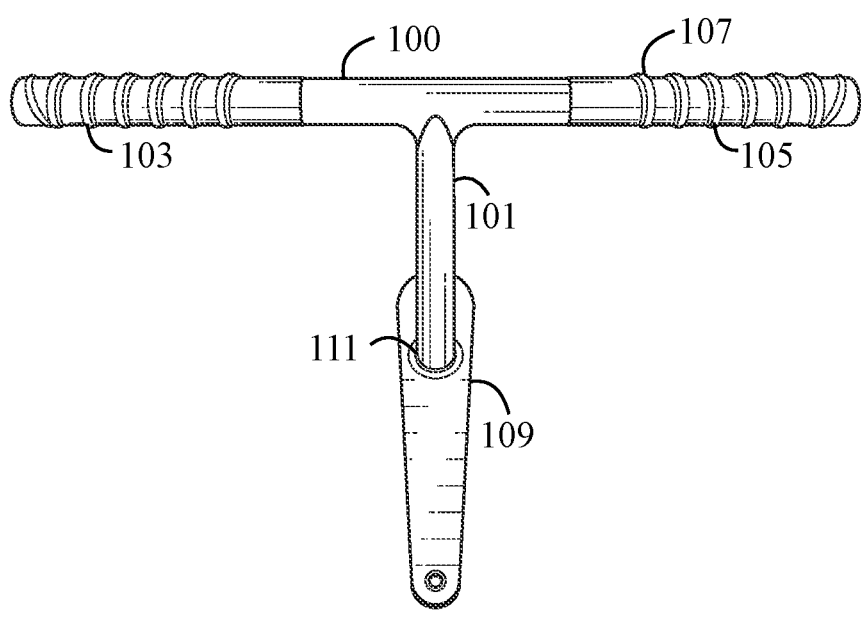
FIG. 1 illustrates a perspective view of the handlebars, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided here relate to a motorcycle child safety system which allows a child to safely ride a motorcycle while being positioned in front of the operator (i.e., the driver). The motorcycle child safety system includes handlebars and foot pegs each positioned to be in contact with the child's hands and feet respectively. The handlebars are mounted to the gas tank of the motorcycle to allow the child to reach and grasp the handlebars while seated in front of the operator. The foots legs are mounted on each side of the motorcycle to allow the child's feet to rest on the foot pegs while seated in front of the operator.

In some embodiments, the handlebars may be adjustable to allow the operator and/or the child to adjust the height of the handlebars. This feature may allow the handlebars to be comfortably used by the child as they grow or adjusted for children of various heights and comfort preferences.

In some embodiments, the mount for the handlebar may be adjustable to allow for the handlebars to be moved forward or rearward on the gas tank.

In some embodiments, the foot pegs are constructed of a $\frac{3}{16}''$ steel plate cut to form foot peg brackets with holes drilled to accept various foot pegs and holes for bolts to mount to the primary case and the transmission case with quarter and ⁵⁄₁₆" bolts. The handlebars may be constructed of ¾" solid round steel welded to ¼" steel plate that's shaped to fit the insert on the tank dash with holes for mounting to the gas tank of the motorcycle. One skilled in the arts will readily understand that the above dimensions are for exemplary purposes and may be modified without deterring from the inventive features.

FIG. 1 illustrates a perspective view of the handlebars 100 component of the motorcycle child safety system. The handlebars include a riser 101 connected, or integrally molded to a left bar 103 and a right bar 105. The riser 101 may be adjustable to allow the operator or child passenger to adjust the height of the handlebars 101 for comfort or user preference. Each of the left bar 103 and the right bar 105 may include a grip 107 to provide an ergonomic and comfortable area for the child to grasp the handlebar 100 during use. One skilled in the arts will readily understand that the shape, size, and configuration of the handlebars 100 and its components may be modified for aesthetics or comfort and may take various forms as is known in the arts. A handlebar mount 109 is provided at a bottom end 111 of the riser 101 and mounts to the gas tank. The handlebar mount 109 may be readily removed if not needed (i.e., if the child is not riding as a passenger on the motorcycle). The riser 101 extends between the handlebar mount 109 and the left and right bars 103,105.

Figure 2:
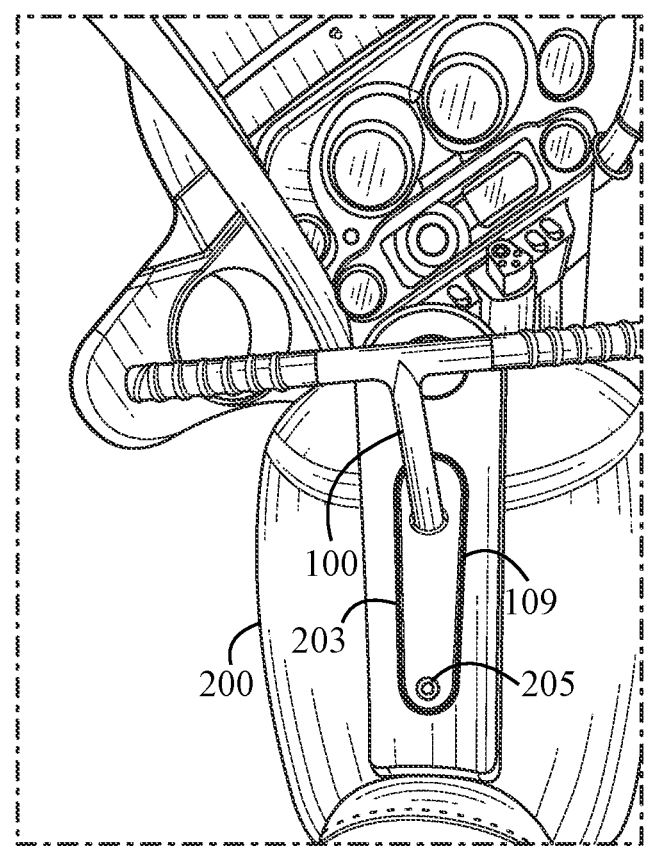
FIG. 2 illustrates a perspective view of the handlebars coupled to the gas tank of a motorcycle, according to some embodiments.

FIG. 2 illustrates the handlebar 100 coupled to the gas tank 200 via a handlebar mount 109 which removably couple to the gas tank via screws or others fasteners. The handlebar mount 109 may be adjustable having receivers 205 positioned along the length of the handlebar mount 203 to allow the handlebar 100 to be moved toward the front or back the gas tank 200.

Figure 4:
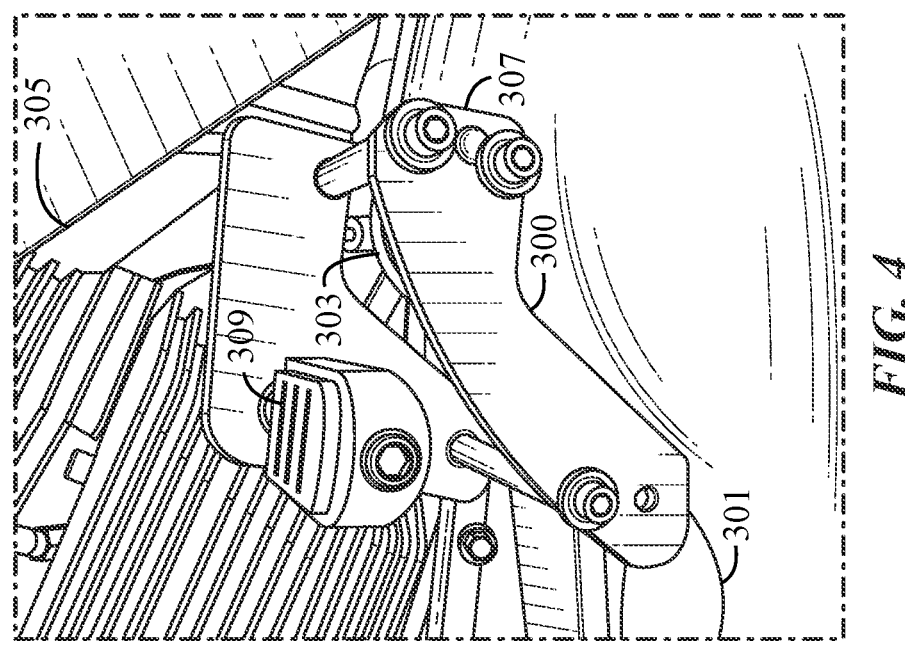
FIG. 4 illustrates a perspective view of the foot pegs coupled to the motorcycle, according to some embodiments.
Figure 3:
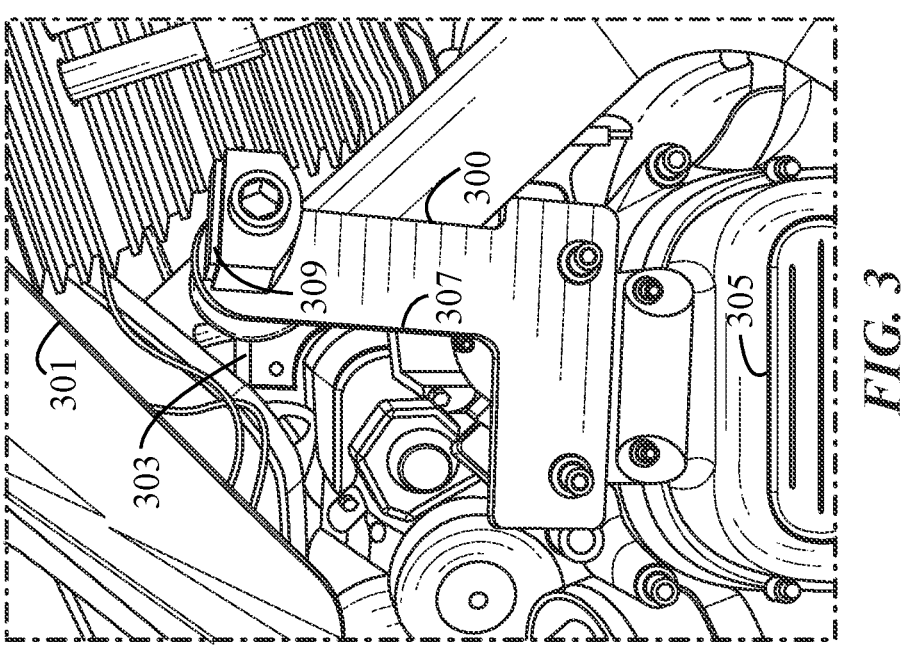
FIG. 3 illustrates a perspective view of the foot pegs coupled to the motorcycle, according to some embodiments.

FIG. 3 and FIG. 4 illustrate a perspective view of the foot pegs 300 coupled to the motorcycle 301. The foot pegs 300 are positioned on the left and right side of the motorcycle (the right side of the motorcycle is illustrated) such that each of the child's feet may contact the foot pegs 300 during use. Each foot peg 300 is mounted to the transmission case 303 and/or the primary case 305 via bolts 307. This mounting position is significantly higher on the motorcycle to allow the foot pegs 300 to be reach by the child while sitting in front of the operator. Each foot peg 300 is mounted to the transmission case 303 and/or the primary case 305 via a bracket 307. The foot pegs 300 extend perpendicular from the bracket 307 and include a rubber pad 309 providing increased grip and comfort while riding.

Figure 5:
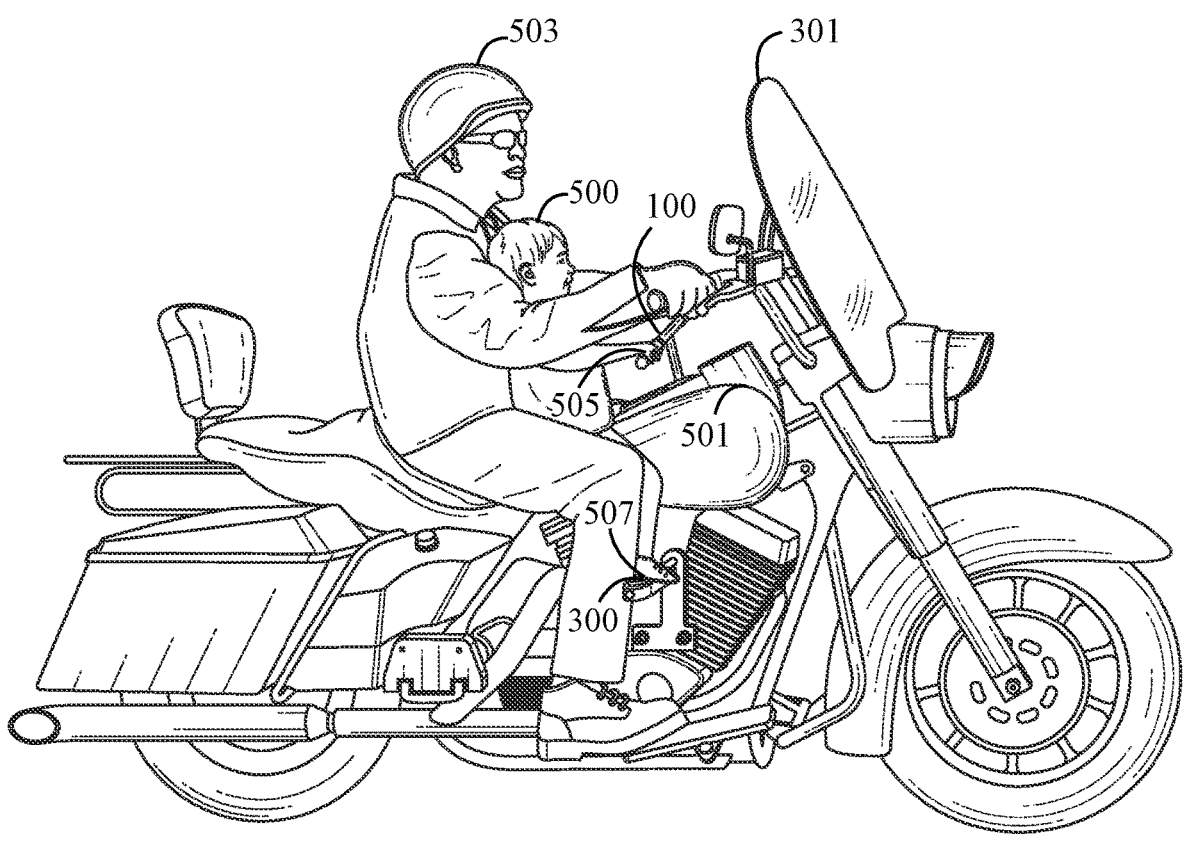
FIG. 5 illustrates a perspective view of a child sitting on the front portion of the motorcycle wherein the child is positioned in front of the driver, according to some embodiments.

FIG. 5 illustrates a perspective view of a child 500 sitting on the front portion 501 of the motorcycle 301 wherein the child 300 is positioned in front of the operator 503. The child 500 is shown grasping the handlebars 100 with their hands 505 and having their feet 505 positioned on the foot pegs 300 to provide a safe and comfortable riding position.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A motorcycle child safety system comprising:
a handlebar including a handlebar mount to couple the handlebar to a gas tank of a motorcycle;
a riser extending between the handlebar mount and a left bar and a right bar configured to allow a child to grasps the left bar and the right bar;
two foot pegs wherein a first foot peg is positioned on a left side of the motorcycle and a second foot peg positioned on a right side of the motorcycle to allow the child to rest their feet on each foot peg,
wherein each of the two foot pegs are mounted to a transmission case via a bracket.

2. The motorcycle safety system of claim 1, wherein a height of the handlebar is adjustable via an adjustable riser.

3. The motorcycle safety system of claim 1, wherein the handlebar mount is adjustable.

4. The motorcycle safety system of claim 1, wherein the handlebar mount is adjustable by moving the handlebar mount toward a front or a back of the gas tank.

5. The motorcycle safety system of claim 1, wherein the left bar includes a first grip.

6. The motorcycle safety system of claim 1, wherein the right bar includes a second grip.

7. The motorcycle safety system of claim 1, wherein each of the two foot pegs are mounted to a primary case via the bracket.

8. The motorcycle safety system of claim 7, wherein each of the two foot pegs extend laterally from the bracket.

9. The motorcycle of claim 1, wherein each of the two foot pegs include a rubber pad.

10. A motorcycle child safety system, comprising:
a handlebar including a handlebar mount to couple the handlebar to a gas tank of a motorcycle;
a riser extending between the handlebar mount and a left bar and a right bar, wherein a child grasps the left bar and right bar;
two foot pegs wherein a first foot peg is positioned on a left side of the motorcycle and a second foot peg positioned on a right side of the motorcycle configured to allow the child to rest their feet on each foot peg,
wherein the handlebar and the two foot pegs are configured to permit the child to be seated in front of an operator on the motorcycle while grasping the handlebars and resting the feet on the foot pegs during use of the motorcycle, and
wherein each of the two foot pegs are mounted to a transmission case via a bracket.

11. The motorcycle safety system of claim 10, wherein a height of the handlebar is adjustable via an adjustable riser.

12. The motorcycle safety system of claim 10, wherein the handlebar mount is adjustable.

13. The motorcycle safety system of claim 10, wherein the handlebar mount is adjustable by moving the handlebar mount toward a front or a back of the gas tank.

14. The motorcycle safety system of claim 10, wherein the left bar includes a first grip.

15. The motorcycle safety system of claim 10, wherein the right bar includes a second grip.

16. The motorcycle safety system of claim 10, wherein each of the two foot pegs are mounted to a primary case via the bracket.

17. The motorcycle safety system of claim 16, wherein each of the two foot pegs extend laterally from the bracket.

18. The motorcycle safety system of claim 17, wherein each of the two foot pegs include a rubber pad.

* * * * *